United States Patent
Kim et al.

(10) Patent No.: US 6,512,047 B2
(45) Date of Patent: Jan. 28, 2003

(54) POLYOXYMETHYLENE RESIN COMPOSITIONS HAVING ENHANCED TENSILE ELONGATION, THERMAL STABILITY AND IMPACT RESISTANCE PROPERTIES

(75) Inventors: Tak-Kyu Kim, Kunpo-shi (KR); Jong-Taek Lee, Kunpo-shi (KR); Ki-Chang Hong, Kunpo-shi (KR)

(73) Assignee: Korea Engineering Plastics Co., Ltd. (KR)

( * ) Notice: Subject to any disclaimer, the term of this patent is extended or adjusted under 35 U.S.C. 154(b) by 0 days.

(21) Appl. No.: 09/858,274

(22) Filed: May 15, 2001

(65) Prior Publication Data

US 2001/0049415 A1 Dec. 6, 2001

Related U.S. Application Data

(63) Continuation-in-part of application No. 09/268,855, filed on Mar. 15, 1999, now abandoned.

(30) Foreign Application Priority Data

Nov. 14, 1998 (KR) .............................................. 98-48895

(51) Int. Cl.[7] ............................................... C08L 59/00
(52) U.S. Cl. ............................ 525/66; 525/64; 525/399; 525/400; 525/441; 525/456; 525/472
(58) Field of Search ........................... 525/64, 66, 399, 525/400, 417, 472, 441, 456

(56) References Cited

U.S. PATENT DOCUMENTS

| | | | | |
|---|---|---|---|---|
| 4,169,867 A | * | 10/1979 | Burg | 525/417 |
| 4,556,690 A | * | 12/1985 | Nakagawa | 525/64 |
| 4,670,508 A | * | 6/1987 | Ohdaira | 525/64 |
| 5,244,946 A | * | 9/1993 | Guest | 524/86 |

* cited by examiner

*Primary Examiner*—Patricia A. Short
(74) *Attorney, Agent, or Firm*—Anderson Kill & Olick, P.C.

(57) ABSTRACT

A polyoxymethylene resin composition, having enhanced tensile elongation, thermal stability, processability and impact resistance, comprises: (i) from 45 to less than 97% % by weight of a polyoxymethylene resin (Component A); (ii) from 1 to less than 20% by weight of a thermoplastic polyester elastomer (Component B); (iii) from 2 to 35% by weight of a thermoplastic polyurethane elastomer (Component C); and (iv) from 0.1 to less than 10% by weight of a maleic anhydride-grafted aliphatic polyolefinic rubbery polymer (Component D), based on the total weight of Components A, B, C and D.

12 Claims, No Drawings

POLYOXYMETHYLENE RESIN COMPOSITIONS HAVING ENHANCED TENSILE ELONGATION, THERMAL STABILITY AND IMPACT RESISTANCE PROPERTIES

CROSS REFERENCE TO RELATED APPLICATION

This application is a continuation-in-part(CIP) application of U.S. Ser. No. 09/268,855 filed on Mar. 15, 1999, which is now abandoned and claims priority thereon pursuant to 35 USC section 120.

FIELD OF THE INVENTION

The present invention relates to a novel polyoxymethylene resin composition having improved tensile elongation, impact resistance, thermal stability and processibility, which comprises a polyoxymethylene matrix, a polyester elastomer, a polyurethane elastomer, and a maleic anhydride-grafted aliphatic polyolefinic rubbery polymer.

BACKGROUND OF THE INVENTION

Polyoxymethylene resins have been widely used in various applications owing to their good mechanical, chemical, physical and electrical properties. However, the impact resistance of conventional polyoxymethylene resins is not sufficiently high for certain applications. Accordingly, there have been various attempts to develop polyoxymethylene resins having enhanced impact resistance by way of adding another polymer component thereto.

For example, there have been reported a number of polyoxymethylene blends which contain: a rubbery polymer containing nitrile or carboxylic ester groups disclosed in, e.g., Japanese Patent Publication No. 12674/1970; a copolymer of α-olefin and α,β-unsaturated carboxylic acid disclosed in, e.g., Japanese Patent Publication No. 18023/1970; a copolymer of ethylene and vinylic or acrylic ester disclosed in, e.g., Japanese Patent Publication No. 26231/1970; a rubbery polymer such as a diolefin-nitrile copolymer disclosed in, e.g., U.S. Pat. No. 3,476,832; an aliphatic polyether disclosed in, e.g., Japanese Patent Publication No. 33095/1975; a mixture of a polyolefin polymer and an ethylene-vinyl copolymer disclosed in, e.g., Japanese Patent Laid-open Publication No. 40346/1974; and a polyolefin, polystyrene, polyester or polyamide-based thermoplastic elastomer disclosed in, e.g., Japanese Patent Laid-open Publication No. 164116/1985.

However, the added polymer components in the above-mentioned blends are not readily miscible with polyoxymethylene resins; and despite attempts to homogenize the blends, the resulting improvements in the impact resistance have been limited.

It has also been suggested that segregated discrete particles of a thermoplastic polyurethane elastomer, when dispersed in a polyoxymethylene matrix, can improve the impact resistance thereof. For instance, U.S. Pat. No. 5,286,807 discloses an impact resistant polyoxymethylene composition consisting essentially of 5 to 15 wt % of a thermoplastic polyurethane having a soft segment glass transition temperature of lower than 0 C,, and 85 to 95 wt % of a polyoxymethylene polymer having a number average molecular weight of 20,000 to 100,000, the thermoplastic polyurethane being dispersed in the polyoxymethylene as discrete particles.

Further, U.S. Pat. No. 4,804,716 discloses a polyoxymethylene composition consisting essentially of 60 to 85 wt % of a polyoxymethylene polymer and 15 to 40 wt % of a thermoplastic polyurethane dispersed in the polyoxymethylene polymer as small discrete particles of 0.01 to 0.9 μm.

However, the above-mentioned polyoxymethylene compositions containing polyurethane elastomer particles suffer from various deficiencies including the handling difficulties in an injection molding process due to their low thermal stability, and in an extrusion process due to their phase separation or die swelling.

U.S. Pat. No. 5,244,946 discloses thermoplastic polymer blends comprising a monovinylidene aromatic copolymer optionally modified with a rubber, a polyoxymethylene polymer and an elastomeric material selected from a thermoplastic polyurethane or an elastomeric copolyester. The monovinylidene aromatic copolymer employed in the polymer blends as a compatibilizer, however, is difficult to synthesize and not commercially available.

Further, U.S. Pat, No. 4,556,690 relates to a polyoxymethylene resin composition comprising a polyoxymethylene base resin and at least one alpha-olefin polymer grafted with an unsaturated carboxylic acid; and U.S. Pat. No. 4,670,508 describes a thermoplastic resin composition comprising at least one thermoplastic resin such as polyoxymethylene resin and an ultra-high molecular weight polyolefin powder such as an ethylene copolymer which may be modified with at least one polar group such as an acid anhydride group. These resin compositions disclosed in these patents have low tensile elongation and impact resistance.

U.S. Pat. No. 4,169,867, on the other hand, discloses a thermoplastic molding composition comprising a mixture of an oxymethylene polymer and a copolyester elastomer in two molecular weight distribution. However, in this composition, the oxymethylene polymer and the copolyester elastomer undergo phase-separation due to low compatability therebetween.

Accordingly, there has existed a need to develop polyoxymethylene resin compositions having improved processibility as well as good tensile elongation, impact resistance and thermal stability.

SUMMARY OF THE INVENTION

It is, therefore, an object of the present invention to provide a novel polyoxymethylene resin composition having improved processibility as well as thermal stability, impact resistance and tensile elongation, by way of adding, to a polyoxymethylene, a thermoplastic polyester elastomer and a thermoplastic polyurethane elastomer together with a maleic anhydride-grafted aliphatic polyolefinic rubbery polymer as a homogenizing agent.

It is another object of the present invention to provide articles formed from the inventive polyoxymethylene resin composition.

In accordance with one aspect of the present invention, there is provided a polyoxymethylene resin composition comprising:

(i) from 45 to less than 97% by weight of a polyoxymethylene resin (Component A);

(ii) from 1 to less than 20% by weight of a thermoplastic polyester elastomer (Component B)

(iii) from 2 to 35% by weight of a thermoplastic polyurethane elastomer (Component C) and (iv) from 0.1 to less than 10% by weight of a maleic anhydride-grafted aliphatic polyolefinic rubbery polymer (Component D), based on the total weight of Components A, B, C and D.

In accordance with another aspect of the present invention, there is provided an article shaped from the inventive polyoxymethylene resin composition.

DETAILED DESCRIPTION OF THE INVENTION

The present invention is characterized by the homogenization of a thermoplastic polyester elastomer (Component B) and a thermoplastic polyurethane elastomer (component C) with a polyoxymethylene (Component A) by the action of a maleic anhydride-grafted aliphatic polyolefinic polymer which contains substituted succinic anhydride groups (Component D). Such homogenization of otherwise incompatible Components A, B and C is believed to take place through the chemical reactions of the succinic anhydride groups of Component D with various end groups of the elastomers and the polyoxymethylene base resin, as is further discussed herein.

Each of the constituent components of the inventive composition is described below.

Major Components and Additives (A) Polyoxymethylene Resin

A polyoxymethylene resin is a polymer having an oxymethylene repeating unit; and the polyoxymethylene resin component (Component A) of the present invention may be a homopolymer having the oxymethylene repeating unit, an oxymethylene-oxyalkylene copolymer, or a mixture thereof.

The homopolymer may be prepared by polymerizing formaldehyde or a cyclic oligomer thereof such as trioxane; and the copolymer may be prepared by polymerizing formaldehyde or a cyclic oligomer thereof with an alkylene oxide or a cyclic formal, e.g., 1,3-dioxolane, diethyleneglycolformal, 1,4-propanediolformal, 1,4-butanediolformal, 1,3-dioxepaneformal, 1,3,6-trioxocane and the like. Representative alkylene oxides include ethylene oxide, propylene oxide, butylene oxide and phenylene oxide.

The homopolymer and the copolymer may be stabilized by capping the terminal groups thereof by esterification or etherification. An oxymethylene-oxyethylene copolymer may be stabilized by removing unstable end-oxymethylene groups to obtain a stabilized copolymer having —CH$_2$CH$_2$OH end groups according to the method disclosed, e.g., in U.S. Pat. No. 3,219,623, which is incorporated herein by reference.

Preferred in the present invention is a polyoxymethylene homopolymer or an oxymethylene-oxyethylene copolymer having a melting point of about 165° C., a degree of crystallinity of 65 to 85% and an average molecular weight of 10,000 to 200,000. Such homopolymer or copolymer may be employed in an amount ranging from 45 to less than 97% by weight, preferably from 65 to 95% by weight of the composition.

(B) Polyester Elastomer

Component (B), a thermoplastic polyester elastomer, is a polyester block copolymer having a crystalline hard segment and a non-crystalline soft segment, the hard segment being prepared by transesterifying and polycondensing an aromatic diacid with a short-chain diol and the soft segment, with a long-chain diol.

Exemplary aromatic diacids which may be used in the present invention include dimethyl terephthalate, terephthalic acid, isophthalic acid, dimethyl isophthalate, 1,5-naphthalene dicarboxylic acid, 2,6-naphthalene dicarboxylic acid, dimethyl 2,6-naphthalate, and a mixture thereof. Among them, dimethyl terephthalate is preferred.

Typical short-chain diols which may be used in the present invention are 1,4-butanediol, 1,6-hexanediol and ethylene glycol; and representative long-chain diols may include polytetramethylene ether glycol, polyethylene glycol, polypropylene glycol and a mixture thereof, having an average molecular weight of 500 to 5,000. 1,4-butanediol and polytetramethylene ether glycol are preferred as a short-chain diol and a long-chain diol, respectively. The terminal groups of the polyester elastomer of the present invention are carboxyl and hydroxyl groups.

In accordance with the present invention, the polyester elastomer preferably has a glass transition temperature ($T_g$) below 0° C., typically about −20° C., and a softening point of 150 to 180° C., e.g., about 155° C., which is lower than the melting point of the polyoxymethylene base resin.

In the inventive composition, the polyester elastomer functions to improve the tensile elongation, impact resistance and thermal stability of the composition.

The thermoplastic polyester elastomer of the present invention is not completely miscible with a polyoxymethylene resin and forms a discrete second phase at a high concentration. In the presence of a maleic anhydride-grafted polymer (Component D), however, the polyester elastomer becomes compatible or homogeneously miscible with the polyoxymethylene base resin.

The thermoplastic polyester elastomer may be employed in an amount ranging from 1 to less than 20% by weight of the composition.

(C) Polyurethane Elastomer

The polyurethane elastomer (Component C) which is used in the inventive composition has a soft segment derived from a long-chain diol having an average molecular weight of 800 to 2,500 and a hard segment derived from a diisocyanate and a chain extender, and may have a $T_g$ of 0° C. or below and a softening point of 70 to 100° C.

The polyurethane elastomer may be prepared by reacting a long-chain diol with a diisocyanate to produce a polyurethane prepolymer having isocyanate end groups, followed by polymerizing the prepolymer with a diol chain extender. Representative long-chain diols are polyester diols such as poly(butylene adipate)diol, poly(ethylene adipate)diol and poly(ε-caprolacton)diol; and polyether diols such as poly(tetramethylene ether)glycol, poly(propylene oxide)glycol and poly(ethylene oxide)glycol.

Illustrative diisocyanates are 4,4'-methylenebis(phenyl isocyanate), 2,4-toluene diisocyanate, 1,6-hexamethylene diisocyanate and 4,4'-methylenebis-(cycloxylisocyanate), wherein 4,4'-methylenebis(phenyl isocyanate) and 2,4-toluene diisocyanate are preferred.

Typical diol chain extenders which may be employed in the present invention are $C_{2-6}$ aliphatic diols such as ethylene glycol, 1,4-butanediol, 1,6-hexanediol and neopentyl glycol.

The polyurethane elastomer of the present invention has —NCO and —OH terminal groups.

The polyurethane elastomer of the present invention is not completely miscible with a polyoxymethylene resin and forms a discrete second phase at a high concentration. In the presence of a maleic anhydride-grafted polymer (Component D), however, the polyurethane elastomer becomes compatible with the polyoxymethylene base resin and functions to enhance the impact resistance of the composition.

In the inventive composition, the polyurethane elastomer may be employed in an amount ranging from 2 less than 35% by weight of the composition.

(D) Maleic Anhydride-Grafted Aliphatic Polyolefinic Polymer

The maleic anhydride-grafted aliphatic polyolefinic polymer (Component D) employed in the inventive composition is an aliphatic polyolefinic elastomer containing substituted succinic anhydride groups. The maleic anhydride-grafted polymer functions as a homogenizing agent which is capable of substantially homogeneously dispersing elastomeric components, i.e., Component B and Component C, in Component A, presumably through the chemical reactions between the succinic groups and the end groups of Components A, B and C.

Namely, the hydroxy, carboxyl and/or acetyl end groups of the elastomer and the base resin components may undergo addition, ester exchange and/or condensation reactions with the succinic anhydride groups to form, e.g., various cross-linking bonds among the constituent components. Such chemical bonds are believed to bring otherwise incompatible components together, thereby enhancing the tensile elongation, thermal stability, impact resistance and processibility of the inventive composition.

In this connection, it is noteworthy that Component D, when added alone, lowers the tensile elongation and impact resistance of a polyoxymethylene resin. However, when added together with an elastomeric component, i.e., Component B or Component C, the maleic anhydride-grafted polymer of the present invention is capable of raising the tensile elongation and Izod impact strength by factors of, e.g., 6 and 15, respectively. The inventive compositions having the exceptional tensile elongation and impact resistance properties thus represent a new class of high-performance polyoxymethylene resin compositions.

The maleic anhydride-grafted polymer may be prepared by graft polymerizing maleic anhydride with an aliphatic polyolefin via a conventional method. The maleic anhydride-grafted polymer of the present invention preferably has a melting point of from 110 to 150° C., e.g., about 130° C., and a melt flow index of 1 to 10, e.g., about 3, when measured according to ASTM D 1238 at 2.16 kg/230° C. Preferred aliphatic polyolefin is an ethylene-propylene-butadiene terpolymer.

The grafted polymer may be employed in an amount ranging from 0.1 to less than 10% by weight, preferably 0.5 to 7% by weight of the composition.

(E) Other Optional Ingredients

The inventive resin composition may further comprise one or more additional ingredients such as formaldehyde or formic acid scavengers, mold releasing agents, anti-oxidants, end-group stabilizers, fillers, colorants, reinforcing agents, light stabilizers, pigments, and the like. The additional ingredients may be employed in an amount not to deteriorate the physical properties of the composition.

Common mold releasing agents which may be added to the inventive composition include an alkylene bis-stearamide, wax and polyether glycide, while ethylene bis-stearamide is preferred.

Representative anti-oxidants include sterically hindered bisphenols, particularly, tetra-bis[methylene(3,5-di-t-butyl-4-hydrocinnamate)]methane.

Further, useful end group stabilizers are nitrogen-containing compounds such as reactive hot melt polyamide resins having amine end groups, non-reactive hot melt polyamide resins and low molecular weight amine compounds. Among them, preferred is a low molecular weight amine compound having a melting point of 230° C. or below. Representative low molecular weight amine compounds include triazines such as melamine, acetoguanamine, acryloguanamine and benzoguanamine; hydrazines such as adipic dihydrizide, sebacic dihydrazide, isophthalic dihydrazide, terephthalic dihydrazide and naphthalic dihydrazide; ureas such as urea and thiourea; and dicyandiamides.

Compounding of the Major Components

The inventive resin composition may be prepared by blending the components using a conventional mixer such as Brabender mixer and then melt-compounding the blend using a conventional single or twin screw extruder at a temperature higher than the melting point of the polyoxymethylene base resin, for example 180 to 230° C., preferably 190 to 210° C. Prior to the blending step, the components are preferably dried. Such drying may be conducted at a temperature ranging from 70 to 110° C. for 2 to 6 hours using a dry air having a dew point of about −30 to −40° C. Particularly, the polyurethane elastomer component (Component C) is preferably dried to a water content of 0.1% or less, preferably 0.01% or less, because it easily reacts with water at an ambient temperature.

EXAMPLES

The following Examples are intended to illustrate the present invention more specifically, without limiting the scope of the invention.

In the Examples and Comparative Examples, the components employed are as follows:

Component A: An oxymethylene-oxyethylene random copolymer (KEPITAL® marketed by Korea Engineering Plastics Co., Ltd.) containing about 2.5 wt % of interdispersed oxyethylene groups. This resin is characterized by a tensile elongation of about 60% (as measured by ASTM D 638), Izod impact strength of about 6.5 kgf.cm/cm (as measured by ASTM D 256), a melting point of about 160° C., a specific gravity of about 1.41 (as measured by ASTM D 792) and a melt flow index of about 9 g/10 min (as measured by ASTM D 1238 at 2.16 kg/190° C.).

Component B: A polyester elastomer (SKYPEL® marketed by SK Chemicals of Korea) having a polybutylene terephthalate segment and a polytetramethylene ether glycol terephthalate segment at a ratio of about 50:50. This polyester has a specific gravity of about 1.16, a melting point of about 155° C. and a melt flow index of about 12 g/10 min (as measured by ASTM D 1238 at 2.16 kg/190° C.).

Component C: A polyurethane elastomer (SKYTHANE® marketed by SK Chemicals of Korea) having a glass transition temperature of about −20° C. and a softening point of about 85° C.

Component D: A maleic anhydride-grafted aliphatic polyolefinic copolymer prepared by grafting maleic anhydride on an ethylene-propylene-butadiene terpolymer and characterized by a density of about 0.86 g/cm$^3$ (ASTM D 792) and a melt flow index of about 3 g/10 min (at 190° C./2.16 kg).(grafted maleic anhydride content: 0.5–1.0 wt %)

Component D': A maleic anhydride-grafted polystyrenic copolymer prepared by grafting maleic anhydride on polystyrene (grafted maleic anhydride content: about 24 wt %)

Further, in the Examples and Comparative Examples, the physical and processing properties of the composition were evaluated in accordance with the following methods.

1. Die Swell

The sample compositions were melt extruded using a twin screw extruder at about 200° C. to form pellets and the observed die swelling was rated on a scale of 1 (excellent) to 5 (poor).

2. Tensile Elongation (%)

The resin compositions were tested in accordance with ASTM D 638 at an elongation speed of 5 mm/min.

3. Izod Impact Strength-Notched (kgf cm/cm)

The resin compositions were tested in accordance with ASTM D 256.

4. Mold Deposit

The resin compositions were injection-molded using a test mold at a cylinder temperature of 220° C. After 600 shoots, the amount of residues deposited on the mold was measured with a projector and the result was rated on a scale of 1 (no deposit) to 5. The mold deposit data provides a measure of thermal stability of the resin composition, because a thermally unstable polyoxymethylene composition tends to disintegrate and impact, e.g., para-formaldehyde and other additives which build up on the mold.

Examples 1 to 4 and Comparative Examples 1 to 4

To illustrate the excellent rheological properties possessed by the polyoxymethylene resin compositions containing Components A, B, C and D in accordance with the present invention, the following resin compositions were prepared and compared with the reference compositions which did not contain Component D. The test results are shown in Table 1.

TABLE 1

| | Components | | | | Tensile | Izod Impact Strength | Die | Mold |
| | A | B | C | D | Elongation (%) | (kgf · cm/cm) | Swell | Deposit |
|---|---|---|---|---|---|---|---|---|
| Ex. 1-1[a] | 88.0 | 10.0 | 2.0 | 1.0[c] | 180 | 10.7 | 3 | 2 |
| Ex. 1-2[a] | 88.0 | 10.0 | 2.0 | 2.0[c] | 215 | 11.0 | 2 | 2 |
| Ex. 1-3[a] | 88.0 | 10.0 | 2.0 | 3.0[c] | 228 | 11.5 | 2 | 1 |
| Comp. Ex. 1[a] | 88.0 | 10.0 | 2.0 | — | 148 | 10.2 | 4 | 3 |
| Ex. 2-1[a] | 75.0 | 5.0 | 20 | 1.0[c] | >300 | 18.0 | 2 | 2 |
| Ex. 2-2[a] | 75.0 | 5.0 | 20 | 2.0[c] | >300 | 18.5 | 1 | 2 |
| Ex. 2-3[a] | 75.0 | 5.0 | 20 | 3.0[c] | >300 | 18.9 | 1 | 1 |
| Comp. Ex. 2[a] | 75.0 | 5.0 | 20 | — | >300 | 16.5 | 4 | 3 |
| Ex. 3[b] | 67.5 | 5.0 | 25 | 2.5 | 320[d] | 36.5 | 3 | 2 |
| Com. Ex. 3[b] | 70.0 | 5.0 | 25 | — | Unworkable due to excessive die swelling | | | |
| Ex. 4[b] | 67.5 | 25 | 5.0 | 2.5 | 360[d] | 16.0 | 3 | 1 |
| Comp. Ex. 4[b] | 70.0 | 25 | 5.0 | — | Unworkable due to excessive die swelling | | | |

[a]Each contained 0.3 part of mold release agent (ethylene bis-stearamide), 0.50 part of antioxidant (IRGANOX1010) and 0.2 part of stabilizer (polyamide) per 100 parts of Components A, B and C.
[b]Each contained 0.18 part of mold release agent (ethylene bis-stearamide), 0.20 part of antioxidant (IRGANOX1010) and 0.1 part of stabilizer (polyamide) per 100 parts of Components A, B, C and D.
[c]Parts per 100 parts of Components A, B and C.
[d]Tested at the elongation speed of 50 mm/mm.

The results in Table 1 demonstrate that the tensile elongation, impact resistance and die swelling properties of blends containing Components A, B and C can be greatly enhanced by the addition of suitable amounts of Component D. The exceptionally high tensile elongation and impact strength observed in the composition obtained in Examples 3 and 4 show that the inventive composition containing Components A, B, C and D is a totally new high-performance polyoxymethylene resin having a satisfactory level of thermal stability.

Examples 5 and 6 and Comparative Examples 5 to 13

In order to illustrate the good processability of the polyoxymethylene resin compositions of the present invention, the following resin compositions were prepared and compared with various reference compositions. The test results are shown in Table 2.

TABLE 2

| | Components | | | | | Processability |
| | A | B | C | D | D' | (Die Swell) |
|---|---|---|---|---|---|---|
| Ex. 5[a] | 80.0 | 15.0 | 5.0 | 1.0[c] | — | 2 |
| Ex. 6[a] | 80.0 | 15.0 | 5.0 | 3.0[c] | — | 1 |
| Comp. Ex. 5[a] | 100.0 | — | — | — | — | 1 |
| Comp. Ex. 6[a] | 90.0 | 10.0 | — | — | — | 2 |
| Comp. Ex. 7[a] | 80.0 | 20.0 | — | — | — | 5 |
| Comp. Ex. 8[a] | 80.0 | 20.0 | — | 1.0[c] | — | 4 |
| Comp. Ex. 9[a] | 80.0 | 20.0 | — | 3.0[c] | — | 3 |
| Comp. Ex. 10[a] | 80.0 | 19.0 | 1.0 | — | — | 4 |
| Comp. Ex. 11[a] | 80.0 | 17.0 | 3.0 | — | — | 3 |
| Comp. Ex. 12[a] | 80.0 | 15.0 | 5.0 | — | — | 3 |
| Comp. Ex. 13[a] | 80.0 | 15.0 | 5.0 | — | 3.0[c] | 3 |

[a]Each contained 0.3 part of mold release agent (ethylene bis-stearamide), 0.50 part of antioxidant (IRGANOX1010) and 0.2 part of stabilizer (polyamide) per 100 parts of the total components employed.
[c]Parts per 100 parts of Components A, B and C.

Table 2 shows that although the addition of polyester and polyurethane elastomers to a polyoxymethylene resin lowers the processability of the polyoxymethylene resin itself, such poor processability of the blend can be enhanced by the addition of suitable amounts of Component D according to the present invention as a compatibilizer, and this improvement in processability is a critical feature of the present invention which cannot be achieved by other compatibilizers disclosed in the prior art, including Component D'.

Examples 7 to 11 and Comparative Examples 14 to 25

To demonstrate the improvement in tensile elongation, impart strength and processability achieved in the polyoxymethylene resin compositions in accordance with the present invention, various resin compositions were further prepared and compared with the reference compositions which did not contain at least one of the essential components of the present invention. The test results are shown in Table 3.

TABLE 3

|  | Components | | | | Tensile Elongation (%)ᵃ⁾ | Izod Impact Strength (kgf cm/cm) | Die Swell | Mold Deposit |
| --- | --- | --- | --- | --- | --- | --- | --- | --- |
|  | A | B | C | D |  |  |  |  |
| Ex. 7 | 89.0 | 5.0 | 5.0 | 1.0 | 90 | 9.0 | 1 | 1 |
| Ex. 8 | 78.0 | 15.0 | 5.0 | 2.0 | 170 | 12.5 | 1 | 1 |
| Ex. 9 | 83.5 | 5.0 | 10.0 | 1.5 | 150 | 11.5 | 1 | 1 |
| Ex. 10 | 78.0 | 5.0 | 15.0 | 2.0 | 190 | 15.5 | 2 | 1 |
| Ex. 11 | 62.5 | 10.0 | 25.0 | 2.5 | 340 | 100.5 | 2 | 1 |
| Com. Ex. 14 | 94.0 | — | 5.0 | 1.0 | 65 | 6.5 | 1 | 3 |
| Com. Ex. 15 | 81.0 | — | 15.0 | 4.0 | 130 | 13.0 | 1 | 4 |
| Com. Ex. 16 | 68.0 | — | 25.0 | 7.0 | 310 | 31.0 | 2 | 5 |
| Com. Ex. 17 | 99.0 | — | — | 1.0 | 35 | 6.0 | 1 | 1 |
| Com. Ex. 18 | 96.0 | — | — | 4.0 | 35 | 5.0 | 1 | 2 |
| Com. Ex. 19 | 93.0 | — | — | 7.0 | 30 | 5.0 | 1 | 2 |
| Com. Ex. 20 | 94.0 | 5.0 | — | 1.0 | 55 | 7.0 | 1 | 1 |
| Com. Ex. 21 | 81.0 | 15.0 | — | 4.0 | 95 | 9.0 | 3 | 1 |
| Com. Ex. 22 | 68.0 | 25.0 | — | 7.0 | 180 | 10.5 | 2 | 1 |
| Com. Ex. 23 | 95.0 | 5.0 | — | — | 45 | 7.0 | 1 | 1 |
| Com. Ex. 24 | 85.0 | 15.0 | — | — | 50 | 9.0 | 2 | 2 |
| Com. Ex. 25 | 75.0 | 25.0 | — | — | Unworkable due to excessive die swelling | | | |

*Each composition contained 0.18 part mold release agent (ethylene bis-stearamide), 0.20 part antioxidant (IRGANOX1010) and 0.1 part stabilizer (polyamide) per 100 parts of the total components A, B, C and D.

As the results in Table 3 show, the polyoxymethylene resin compositions containing Components A, B, C and D in accordance with the present invention exhibit harmonized good tensile elongation and impact resistance, thermal stability and processibility when compared with the reference compositions not containing at least one of the essential components of the present invention.

While the invention has been described with respect to the specific embodiments, it should be recognized that various modifications and changes may be made by those skilled in the art which also fall within the scope of the invention as defined by the appended claims.

What is claimed is:

1. A polyoxymethylene resin composition comprising: (i) from 45 to less than 97% by weight of a polyoxymethylene resin (Component A); (ii) from 1 to less than 20% by weight of a thermoplastic polyester elastomer (Component B); (iii) from 2 to 35% by weight of a thermoplastic polyurethane elastomer (Component C); and (iv) from 0.1 to less than 10% by weight of an ethylene-propylene-butadiene terpolymer grafted with a monomer consisting essentially of maleic anhydride (Component D), based on the total weight of Components A, B, C and D.

2. The composition of claim 1, wherein the polyoxymethylene resin is a copolymer.

3. The composition of claim 2, wherein the copolymer is an oxymethylene-oxyethylene copolymer.

4. The composition of claim 1, wherein the polyoxymethylene resin is a homopolymer.

5. The composition of claim 1, wherein the polyester elastomer is a polyester block copolymer having two segments, one being derived from an aromatic diacid and a short-chain aliphatic diol and the other from an aromatic diacid and a long-chain diol.

6. The composition of claim 5, wherein the aromatic diacid is dimethyl terephthalate, the short-chain diol is 1,4-butanediol and the long-chain diol is polytetramethylene ether glycol.

7. The composition of claim 1, wherein the polyurethane elastomer has a soft segment derived from a polyol having an average molecular weight ranging from 800 to 2,500 and a hard segment derived from an aromatic diisocyanate and a chain extender.

8. The composition of claim 7, wherein the polyol is a polyester diol or a polyether diol, the aromatic diisocyanate is 4,4'-methylenebis(phenyl isocyanate) or 2,4-toluene diisocyanate and the chain extender is ethylene glycol, 1,4-butanediol or 1,6-hexanediol.

9. The composition of claim 1, wherein the grafted terpolymer is employed in an amount ranging from 0.5 to 7% by weight.

10. The composition of claim 1, wherein the grafted terpolymer is an ethylene- propylene-butadiene terpolymer containing succinic anhydride groups.

11. The composition of claim 1 further comprising a lubricant, antioxidant and/or stabilizer.

12. An article shaped from the polyoxymethylene resin composition recited in claim 1.

* * * * *